United States Patent [19]

Duca et al.

[11] 4,035,997
[45] July 19, 1977

[54] DEVICE FOR AUTOMATIC ADJUSTMENT OF THE POSITION OF THE CUTTING PLATFORM OF A GRAIN HARVESTING MACHINE

[75] Inventors: Mihail Duca; Dan Vasiliu; Teodor Demetrescu; Ion Cimpoias; Ion Linca; Stefan Breazu; Virgil Antonescu; Iosif Cojocaru, all of Bucharest, Romania

[73] Assignee: Institutul de Cercetari si Proiectari de Masini Agricole - ICPMA, Bucharest, Romania

[21] Appl. No.: 611,255

[22] Filed: Sept. 8, 1975

[51] Int. Cl.² .......................................... A01D 75/28
[52] U.S. Cl. .................................................. 56/209
[58] Field of Search .......................... 56/208, 209–217

[56] References Cited

U.S. PATENT DOCUMENTS

| 2,872,200 | 2/1959 | Kroll | 56/209 X |
| 3,008,724 | 11/1961 | Lapins et al. | 56/209 X |

*Primary Examiner*—Russell R. Kinsey
*Attorney, Agent, or Firm*—Karl F. Ross; Herbert Dubno

[57] ABSTRACT

A device for the automatic adjustment of the position of the cutting platform of a grain-harvesting machine has a hydraulic cylinder attached both to a harvester body and to the cutting platform, the cylinder being supplied with oil under pressure from a pump by means of a differential distributor driven by feelers (sensors) mounted at the ends of the cutting platform.

The differential distributor of the device, according to the invention is made up of a body provided with holes by means of which the distributor is connected to the pump to an oil tank and to the cylinder; inside the body, a casing and a plug are mounted. The casing is provided with holes which when the cutting platform is parallel with the soil register with holes in the plug which has a diametral channel, and with peripheral channels through which the oil passes when the cutting platform is not parallel to the soil.

2 Claims, 3 Drawing Figures

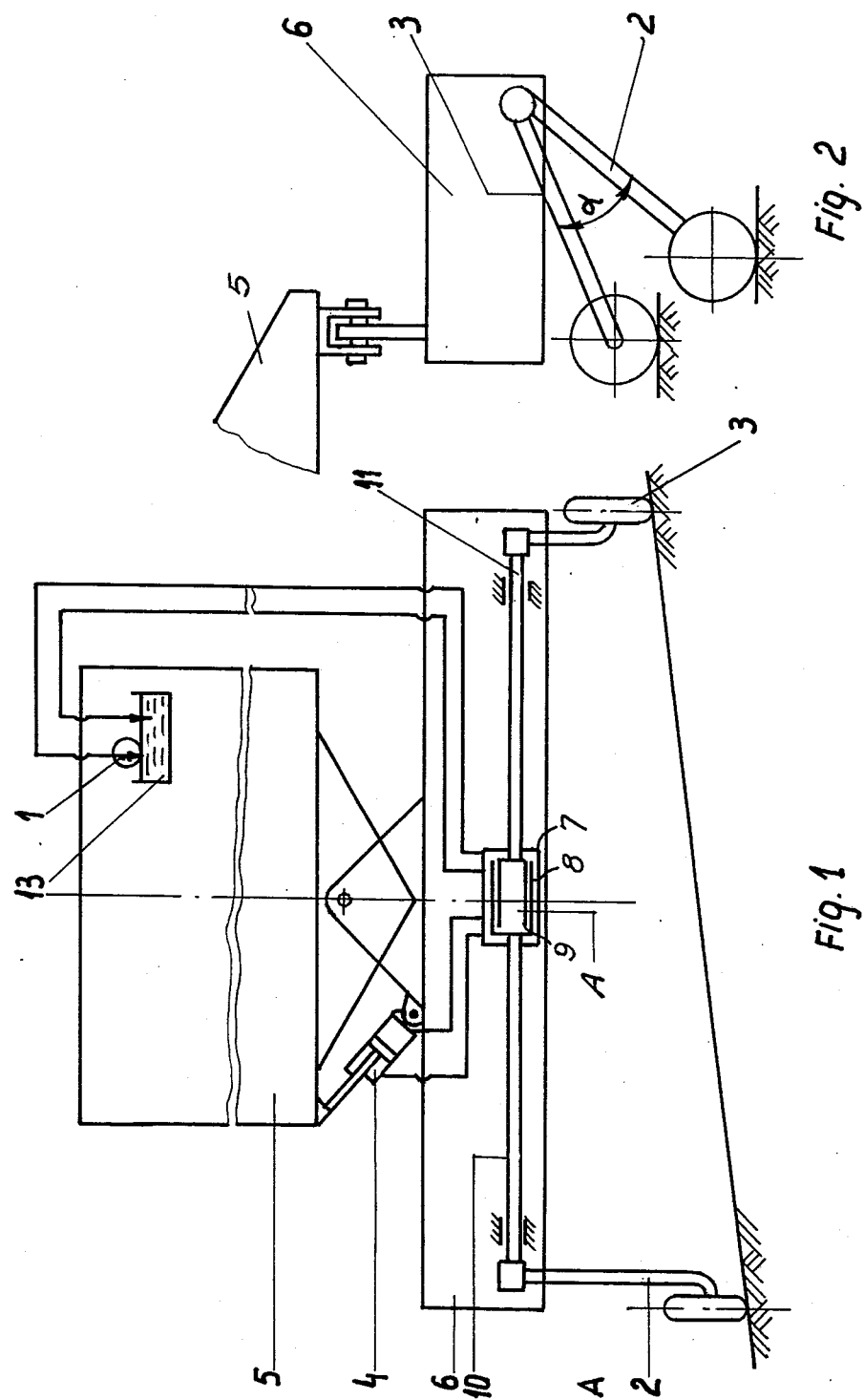

DEVICE FOR AUTOMATIC ADJUSTMENT OF THE POSITION OF THE CUTTING PLATFORM OF A GRAIN HARVESTING MACHINE

FIELD OF THE INVENTION

The present invention refers to a device for the automatic adjustment of the position of the cutting platform relative to the soil of a grain harvesting machine, irrespective of the position on the rest of the harvester body, and for adjusting the cutting height, the device being applicable to grain harvesting machines for slopes.

BACKGROUND OF THE INVENTION

A device for automatic adjustment of the position of the cutting platform relative to the soil for to grain harvesting machines for slopes is known this device maintaining the parallelism between the cutting platform and the ground by means of single action hydrostatic cylinders, connected such that two of them receive the displacements between the front wheel axis and the body because of the body horizontal position and convey these travels through a quantity of liquid to other two cylinders attached between the platform and the body, which in turn, place the platform relative to the body so that the platform lies parallel to the soil.

However, the known device cannot assure precision in operation because of the presence of impurities in the liquid and oil-tube elasticity, so that numerous adjustment and operations resupply of the liquid in the system are necessary.

SUMMARY OF THE INVENTION

The device for automatic adjustment of the position of the cutting platform of a grain harvesting machine, according to the invention, eliminates the above mentioned disadvantages by comprising a hydraulic cylinder linked both to the body of the harvester and to the cutting platform, the cylinder being supplied with oil under pressure from a pump by means of a differential distributor operated by cross rods connected to feelers mounted individually on the two ends of the cutting platform; the differential distributor comprises a body provided with some holes by means of which the distributor is connected both to the pump, to an oil tank and to the cylinder. Inside the body a casing and a plug are mounted, each of them being reinforced with a cross rod the casing is provided with holes which, when the cutting platform is parallel to the ground, register with holes provided in the plug; the plug is provided with a diametral channel and some peripheral channels through which the oil passes when the cutting platform is not parallel to the soil.

BRIEF DESCRIPTION OF THE DRAWING

FIG. 1 is a diagrammatic front view of a device according to the invention

FIG. 2 is a fragmentary diagrammatic side view; and

SPECIFIC DESCRIPTION

Figure 3:
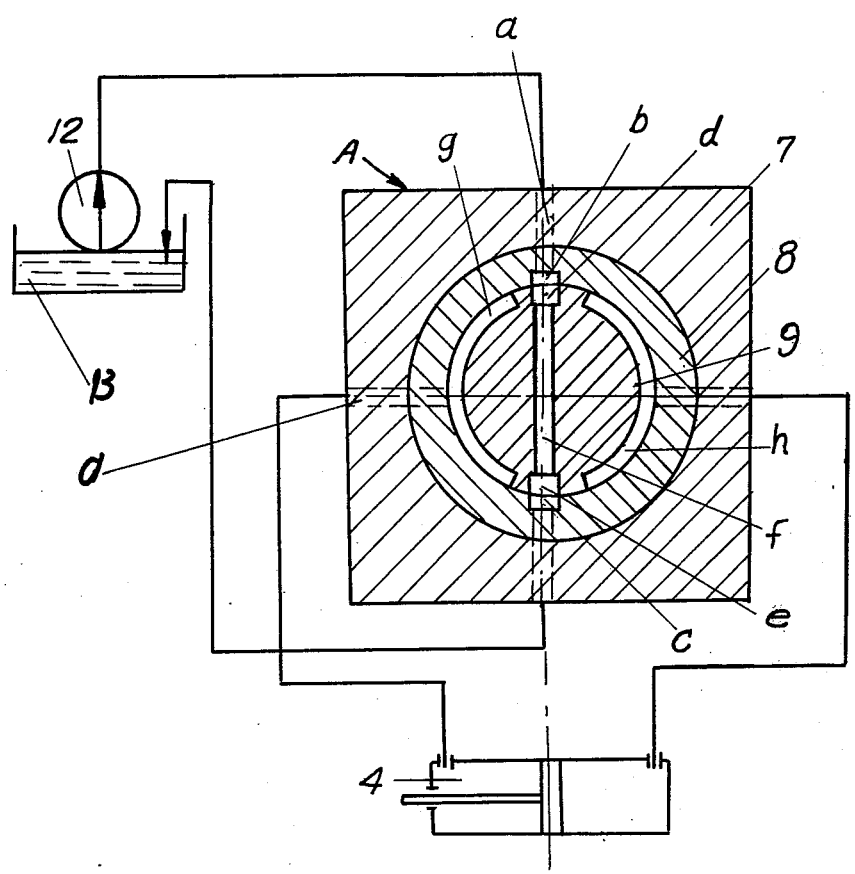
FIG. 3 is a cross section, drawn to an enlarged scale, through the distributor of the device according to the invention.

From a hydrostatic pump 1 through a rotary differential distributor A (see FIG. 3) driven by a pair of feelers 2 and 3, a liquid flow is sent to a double acting hydrostatic cylinder 4, mounted between a harevester body 5 and a cutting platform 6. The distributor has a body 7, (FIG. 3) with holes $a$ for coupling the distributor to the hydrostatic ciruit. Inside the body 7, there is a casing and a plug 9, separately driven by the feelers 2 and 3 by means of the rods 10 and 11. When the cutting platform 6 is maintained parallel with the soil, the feelers 2 and 3 at the platform ends are parallel to each other and the holes $b$ and $c$ in the casing 8 register with to the holes $d$ and $e$ in the plug 9, so that through the channel $f$ in the plug, the oil from the pump 12 is short-circuited to the tank 13. This is the equilibrium position of the device, i.e. the position in which the cutting platform 6 is maintained parallel to the soil.

If the cutting platform 6 is not parallel to the soil, the two feelers 2 and 3 at the ends of the left and right part of the platform are at different heights and form between them an angle. The relative angular movement of the two feelers 2 and 3 is transmitted through the rods 10 and 11, to the casing 8 and the plug 9, so that the holes $b$ and $c$ of the casing 8 communicate with the channels $g$ and $h$ of the plug 9; thus the pressure produced by the pump 1 is applied to one of the faces of the piston of the hydraulic cylinder 4, causing its displacement and forcing into the tank 13 the liquid in the other end of the hydraulic cylinder 4. By displacement of the piston in the hydraulic cylinder 4, the cutting platform 6 is rotated relative to the body 5 in order to restore the parallelism between platform and soil.

This movement results in the relative angular displacement of the feelers the other, so that when achieving the parallelism between platform and the ground is restored, the feelers 2 and 3 are no longer angularly offset and the casing 8 and the plug 9 reach the relative position where the flow from the pump 1 is shunted to the tank 13 and thus the movement of the platform 6 ceases. If the cutting platform is not parallel with the soil, the relative angular position of the feelers 2 and 3 does not change and neither does the position of the casing 8 and the plug 9, the platform 6 remaining parallel with the soil.

The device for automatic adjustment of the position of the cutting platform, according to the invention has the following advantages:

it assures a precise adjustment of the position of the platform with respect to the soil.

it ensures operating safety, it does not need set-up operations during work; and it has a simple construction.

We claim:

1. A device for automatically maintaining a cutting platform of a grain harvesting machine parallel to the ground, said machine comprising a body and means mounting said platform tiltably on said body, said device comprising:

a pair of ground-engaging feelers movably mounted on opposite ends of said platform;

a differential distributor comprising a distributor housing formed with a plurality of ports, a sleeve rotatably received in said housing and provided with a pair of bores, and a plug rotatably received in said sleeve and formed with a passage;

a respective rod connecting one of said feelers with said sleeve and a respective rod connecting the other of said feelers with said plug whereby rotation of said rods and said feelers angularly displaces said sleeve and said plug relatively to one another and to said housing;

a pump connected to one of said ports for supplying hydraulic fluid thereto and a reservoir connected to another of said ports for receiving hyraulic fluid from said distributor; and a double-action piston-and cylinder arrangement connected by said platform and said body for tilting said platform and said body for tilting said platform in response to relative angular displacement of said sleeve and said body, said double acting piston-and cylinder arrangement being connected to further ports of said housing.

2. The device defined in claim 1 wherein said passage extends diametrically through said plug and said sleeve has a pair of bores registering with opposite ends of said passage in a position of said platform parallel to the ground, the ports connected to said pump and said reservoir communicating with said bores and said passages.

* * * * *